United States Patent [19]

Eder

[11] Patent Number: 4,625,410
[45] Date of Patent: Dec. 2, 1986

[54] COMPUTER-AIDED DRAWING OR ENGRAVING DEVICE

[75] Inventor: Hans Eder, Schortens, Fed. Rep. of Germany

[73] Assignee: Franz Kuhlmann Prazisionsmechanik und Maschinenbau GmbH & Co. Kg, Wilhelmshaven, Fed. Rep. of Germany

[21] Appl. No.: 756,991

[22] PCT Filed: Nov. 5, 1984

[86] PCT No.: PCT/EP84/00350

§ 371 Date: Jul. 9, 1985

§ 102(e) Date: Jul. 9, 1985

[87] PCT Pub. No.: WO85/02150

PCT Pub. Date: May 23, 1985

[30] Foreign Application Priority Data

Nov. 10, 1983 [DE] Fed. Rep. of Germany ....... 3340677

[51] Int. Cl.⁴ ...................... B43L 13/00; G06K 15/22; G05B 19/39
[52] U.S. Cl. ........................................ 33/1 M; 33/438
[58] Field of Search ............. 33/1 M, 23 C, 430, 438, 33/446

[56] References Cited

U.S. PATENT DOCUMENTS

| | | | |
|---|---|---|---|
| 1,436,673 | 11/1922 | Nunamaker | 33/438 |
| 1,443,088 | 1/1923 | Pasquariello | 33/438 X |
| 3,473,157 | 10/1969 | Little et al. | 33/1 M X |
| 4,356,632 | 11/1982 | Anderka | 33/18 R |
| 4,430,797 | 2/1984 | Eder | 33/1 M |

FOREIGN PATENT DOCUMENTS

| | | | |
|---|---|---|---|
| 3128699 | 2/1983 | Fed. Rep. of Germany | 33/1 M X |
| 2129175 | 5/1984 | United Kingdom | 33/438 |

Primary Examiner—Harry N. Haroian
Attorney, Agent, or Firm—Pearne, Gordon, Sessions, McCoy, Granger & Tilberry

[57] ABSTRACT

The invention concerns a drawing or engraving device which has a first travelling carriage system with a first and second guide rail each supporting a moving travelling carriage. The second guide rail is attached to the travelling carriage on the first guide rail. A second travelling carriage system is joined to the first travelling carriage system and has two travelling carriages driven by motors. One of these travelling carriages supports a working head which can be manually guided. The coordinates of the actual pattern executed by the working head are determined by means of a distance measuring device. Computing means compare these actual coordinates with coordinates of a selected pattern through which the working head should travel to draw an element or line segment selected by the user. A control device is activated by the computer which calculates any deviation of the actual pattern coordinates from the selected pattern coordinates. The control device drives the travelling carriages of the second travelling carriage system by electric drive means to compensate for the deviation so that the hand guided working head closely follows the selected pattern.

12 Claims, 2 Drawing Figures

COMPUTER-AIDED DRAWING OR ENGRAVING DEVICE

SUMMARY OF THE INVENTION

The invention concerns a drawing or engraving device or plotter with a first and second travelling carriage system. The first travelling carriage system consists of a first guide rail supporting a movable first travelling carriage to which a second guide rail supporting a movable second travelling carriage is attached. The second travelling carriage system is similarly constructed. It is provided to compensate for deviations from the desired pattern.

The second travelling carriage of the first travelling carriage system supports a third guide rail. A working head is mounted on the travelling carriage of the fourth guide rail.

Means are provided to measure the distances covered by the travelling carriages on all four guide rails to determine the actual coordinates in a predetermined coordinate system of the pattern actually travelled by the working head. The second travelling carriage system is provided with electric drive means to drive both travelling carriages. This travelling carriage system constitutes a compensation system. The drive means are locked when in a nonactivated condition.

An analagous drawing device is known from the prior art, which in contrast with the present invention, has a second travelling carriage system that is an independent device that can be attached to a ruler or to the drawing head of the first travelling carriage system.

In the present invention, the working head supports a drawing tool. The working head is controlled with the aide of a computer controlled drive unit to execute a selected predetermined pattern which can comprise line segments or elements. Predetermined patterns include, for example, numbers, letters or curves. The radii of the curves can also be selected. These patterns are stored in the memory and can be selected using an input keyboard. The working head can be guided within its range of motion to draw one or more patterns stored in the memory as numerical signals or values. These patterns can be drawn at any preselected spot.

The purpose of the invention is to present a relatively simple and easy-to-use drawing or engraving device which provides computer-aided freehand drawing or freehand engraving.

The problems of the drawing or engraving devices of the prior art are solved in accordance with the invention by providing, inter alia, program means having an input keyboard for selecting the predetermined pattern coordinates through which the working head should pass to draw a desired pattern. The predetermined coordinates are stored in a memory. A computer calculates the deviation of the actual coordinates of the working head from the predetermined coordinates. Control means connected with drive means drive the travelling carriages of the second travelling carriage system, i.e., the compensation system, according to a value representing the deviation calculated by the computer.

The advantage of the invention is presented especially by the fact that to produce the movement of the working head, the first travelling carriage system is manually guided and is comparable to the easy action of a freehand drawing or drafting machine, while the travelling carriages of the second travelling carriage system connected to the first travelling carriage system can be moved in addition by a motor to produce very exact selected line segments despite inaccurate manual guidance of the working head. Thus, it can be seen that the second travelling carriage system provides a compensation system which corrects or compensates for unavoidable deviations from the selected patterns.

In the foregoing manner, the drawing tool, for example a pencil, secured to the working head follows the selected pattern coordinates exactly despite unavoidable fluctuations caused by manual guidance if the user turns on the computer controlled drive to aid in the execution of a selected pattern and a pattern is selected. Undesired deviations transmitted from the user's hand to the travelling carriages of the first travelling carriage system which normally would be transmitted to the working head, are recognized and recorded by the measuring means as they are made and are corrected by the compensation system within a very short time period.

In order to increase flexibility provided by the system and in particular to facilitate easy drawing of selected patterns, the drawing or engraving device of the invention includes a transformation circuit which is connected to the measuring means. This circuit makes it possible to determine the actual coordinates of the working head (and specifically of the drawing tool located in the working head) in a selected appropriate coordinate system. The programming means similarly allows a line segment to be executed to be inputted in the appropriate selected coordinate systems.

The drive means activate the travelling carriages of the second travelling carriage system which thereby represents the compensation system. The computer can calculate limiting curves on either side of the predetermined patterns and store these in the memory. The computer can activate the control device when the actual coordinates of the working head fall outside of the enclosed area of the limiting curves.

Alternatively, the computer can calculate overlapping tolerance areas for closely adjacent discreet points which approximate the predetermined patterns and activate the control device when the actual coordinates of the working head fall outside of the tolerance areas.

The computer could also calculate approximately the distance between the coordinates of the actual pattern of the working head and the predetermined coordinates of the selected pattern and subsequently activate the control device when the distance exceeds a predetermined value.

In accordance with the invention, a working field or area of activity for the travelling carriages of the compensation system can be selected. This working field is fixed relative to the range of the travelling carriages of the compensation system. The computer can provide in this case for example, a warning signal when the working head passes outside of the working field. The warning signal can be designed to let the user know the direction in which the working head leaves the working area.

Preferably, the memory stores the actual coordinates which the working head has passed through (travelled coordinates) and uses the travelled coordinates or a line segment bordering the travelled coordinates to calculate the deviation of the actual coordinates from the predetermined coordinates of the selected pattern.

It is particularly preferable to provide a conventional drawing head connected between the second travelling carriage of the first travelling carriage system and the first guide rail of the second travelling carriage system. The user operates the drawing device using the drawing head and thereby moves the working head as desired. In this manner the travelling carriages of the first travelling carriage systems and for the purpose of compensation also the travelling carriage of the second travelling carriage system contribute to the movement. The drawing head can be constructed in the usual manner with the option of angular adjustment of the normal or base side.

Alternatively, the first guide rail of the second travelling carriage system, i.e. the third guide rail, can be fixed relative to the second travelling carriage of the first travelling carriage system. A handle for the user is provided in this design to guide the working head in the desired mode.

Further advantages of the invention are illustrated in the following description of the invention.

DETAILED DESCRIPTION OF THE DRAWINGS

Figure 1:
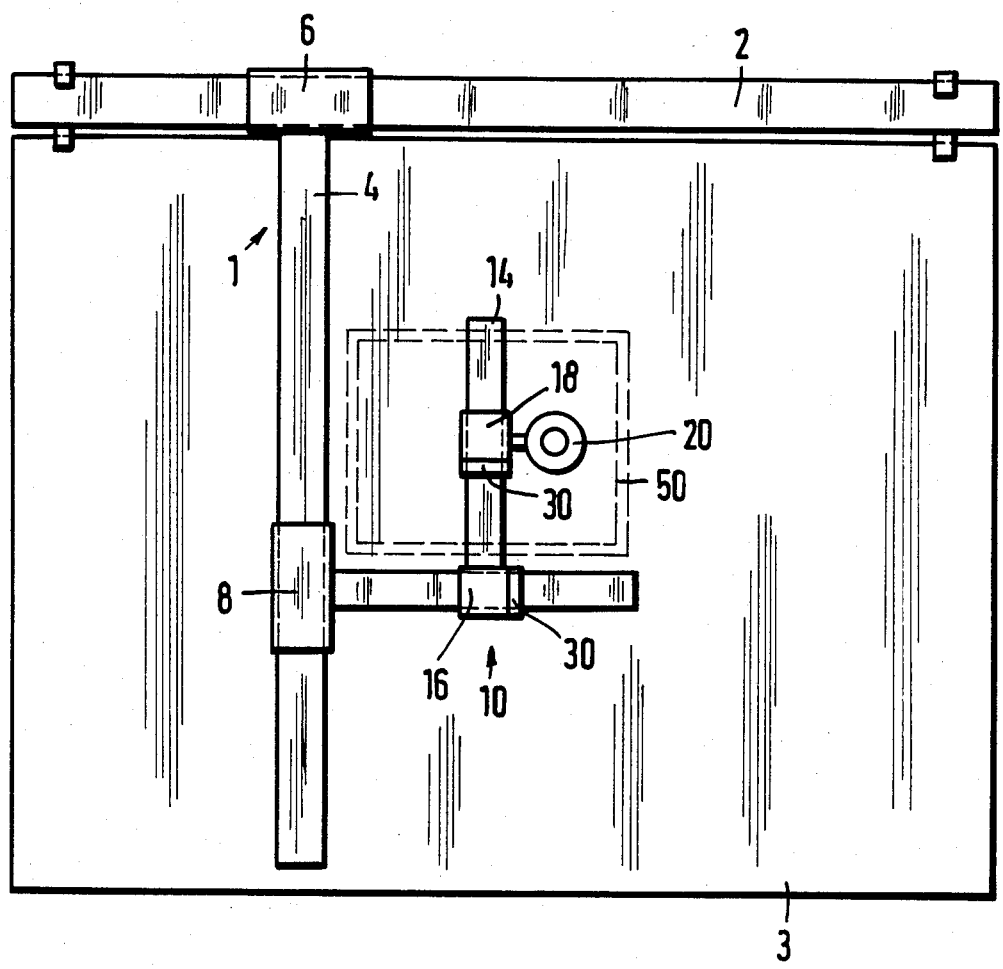
FIG. 1 shows a plan view of a drawing or engraving device in accordance with the invention.

FIG. 1 shows an embodiment of a drawing machine in accordance with the invention. A first travelling carriage system 1 is fastened on a drafting or drawing board 3 so that a first guide rail 2 is fixed to a lateral edge of the drafting board 3 in a stationary parallel position. A first travelling carriage 6 is movable along the first guide rail 2 and supports a second guide rail 4, which extends perpendicular to the first guide rail 2, and which carries a second movable travelling carriage 8. Both travelling carriages 6, 8 of the first travelling carriage system 1 are free moving, that is, movable without motor drive means.

A second travelling carriage system 10 is connected to the second travelling carriage 8 of the first travelling carriage system 1. The second travelling carriage system 10 also has two guide rails, the third guide rail 12 and the fourth guide rail 14. The third guide rail 12 is connected to the second travelling carriage 8 of the first travelling carriage system. This links the first and second travelling carriage systems 1, 10.

The second travelling carriage system 10 includes two travelling carriages, the third travelling carriage 16 and the fourth travelling carriage 18. The third travelling carriage 16 supporting or connected to a fourth guide rail 14, is movable along the third guide rail 12 of the second travelling carriage system. A fourth travelling carriage 18 is movable along the fourth guide rail 14.

Each of the third and fourth travelling carriages 16, 18 of the second travelling carriage system 10 is equipped with drive means 30. Activation of the drive means 30 releases a brake (not shown) which holds the third and fourth travelling carriages 16, 18 relative to their guide rails, 12, 14 when the drive means 30 is not operating.

A working head 20 in which a drawing tool can be clamped, is connected to the second travelling carriage system 10 by the fourth travelling carriage 18. This drawing tool can be for example, a drawing pencil. Distance measuring means 9, 19 (shown in FIG. 2) are positioned on the travelling carriages 6, 8 and 16, 18 of both travelling carriage systems 1, 10. Distance measuring means 9 are positioned on the first and second travelling carriages 6 and 8, while distance measuring means 19 are positioned on the third and fourth travelling carriages 16 and 18. The distance measuring means 9, 19 transmit impulses to an adding circuit 22. The number of pulses transmitted corresponds to the displaced distance of the corresponding travelling carriages.

The adding circuit 22 adds or substracts (according to the direction) the distances calculated for the first and second travelling carriage systems 1, 10. The adding circuit 22 uses these distances to determine the actual coordinates of the working head 20 in a first Cartesian coordinate system. The first coordinate system is defined by the orientation of the guide rails and has a determinable origin.

Figure 2:
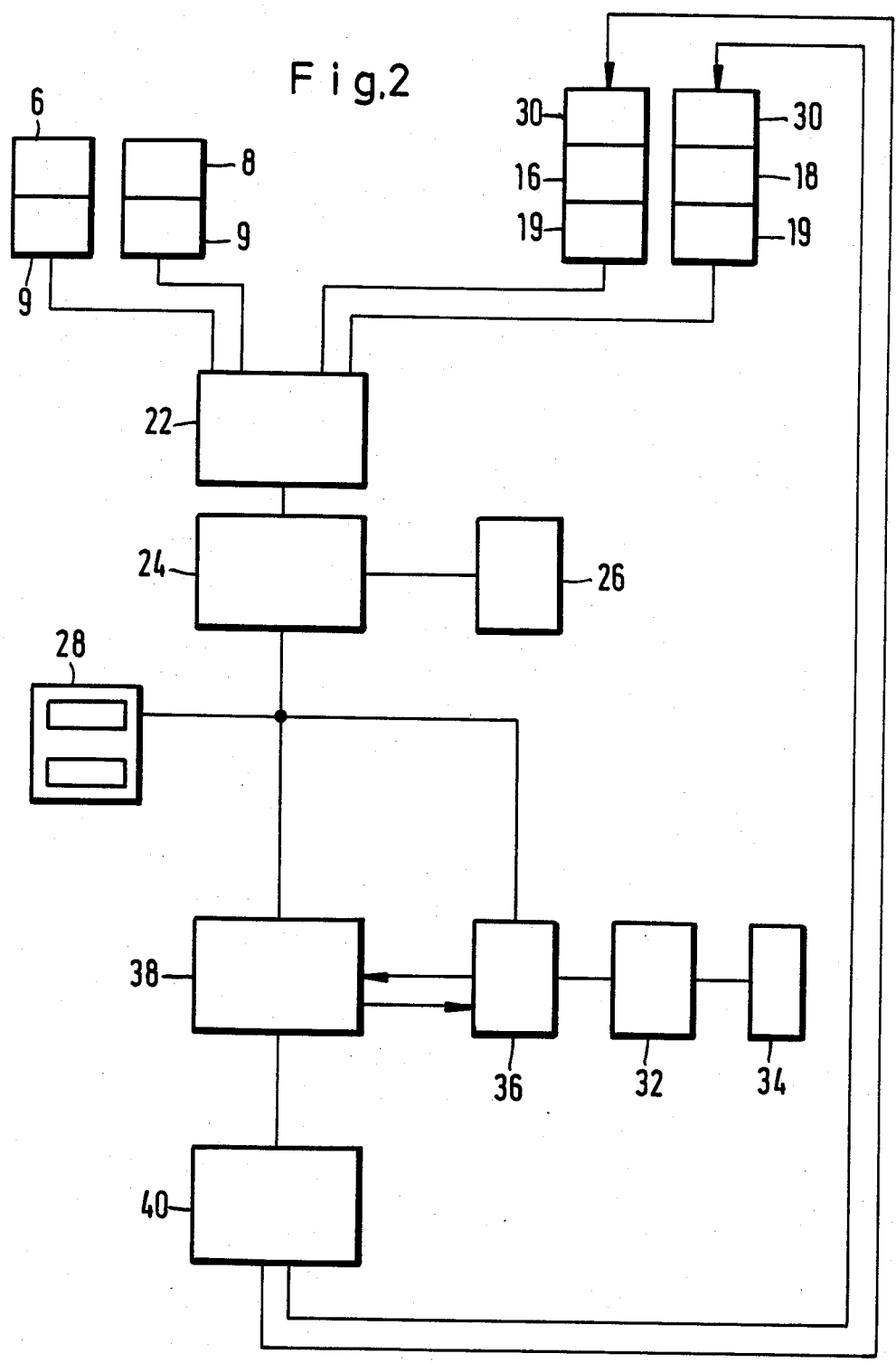
FIG. 2 shows a block diagram of a circuit of a preferred embodiment of the invention.

FIG. 2 shows a block circuit diagram of the drawing or engraving device of FIG. 1. The distance measuring device 9 of the travelling carriages 6, 8 of the first travelling carriage system 1 transmits to the adding circuit 22 counting impulses which correspond to the distance travelled by the travelling carriages of the first system.

The distance measuring means 19 of the travelling carriages 16, 18 of the second travelling carriage system 10 similarly transmit impulses to the adding circuit 22 which correspond to the distances travelled by the travelling carriages of the second system.

The impulses transmitted by the distance measuring means 9, 19 are assigned a positive or negative sign corresponding to the direction of travel within the predetermined Cartesian coordinate system which is defined relative to the perpendicular guide rail system. The impulses are added or subtracted by the adding circuit 22. The adding circuit 22 transmits to a transformation circuit 24 the coordinates of the working head 20 in the first coordinate system. These coordinates are subsequently converted by an input unit 26 into a second selected coordinate system and transmitted from the transformation circuit 24 to an indicator unit 28.

Programming means 32 having an input keyboard is provided to input the coordinates of a selected pattern through which the working head 20 should pass to draw or engrave a desired element or line segment. These coordinates are referred to as the predetermined coordinates. A memory 36 is connected to the programming means 32. The memory 36 receives and stores the inputted predetermined coordinates. The predetermined coordinates can be stored in each of the guide rail defined Cartesian coordinate systems in which the actual coordinates of the working head 20 can be determined.

A computer 38 constantly receives the actual coordinates of the working head 20 transmitted from the transformation circuit 24. The computer 38 determines the deviation of the coordinates of the actual pattern executed by the working head 20 from the coordinates stored in the memory 36 of the selected pattern or line element. The computer 38 transmits a discriminator signal corresponding to the calculated deviation to the control means 40 for drive means 30. The control means 40 are connected with the drive means 30 of the travelling carriages 16, 18. The drive means 30 operate to compensate for the calculated deviation until this deviation has been corrected.

In a second embodiment, the computer 38 can operate in the manner of a two point control by calculating appropriate limiting curves within a given distance of the predetermined pattern or line segments. These limiting curves are stored in the memory 36. In accordance to this method of control, the computer 38 transmits a discriminator signal to the control means 40 whenever the actual coordinates transmitted from the transformation circuit 24 fall outside the area bordered by the limiting curves.

Alternatively, the computer 38 can calculate overlapping tolerance areas for closely adjacent discrete points of the selected pattern or line segments. The computer 38 activates the control means 40 whenever the actual coordinates of the working head 20 fall outside these tolerance areas.

The computer 38 can also calculate the actual difference between the actual coordinates of the working head 20 and the predetermined coordinates and activates the control means 40 whenever the difference exceeds a predetermined limit.

In a further feature, the computer 38 can determine an area of activity or a working field 50 (shown in FIG. 1) for the second travelling carriage system 10, i.e., the compensation system. This working field 50 is positioned inside the range or working area of the travelling carriages 16, 18. The computer 38 transmits a warning signal whenever the working head 20 reaches the edge of the working area of the compensation system or leaves the working field 50, such as might occur after the drive means 3 has been activated several consecutive times. The warning signal can provide the user additional information indicating the direction in which the working head 20 is moving outside the working field 50 for the compensation system. This enables the user to manually guide the working head 20 back into the proper working field 50. In this manner, it can be assured that the manually guided movement of the travelling carriages 6, 8 of the first travelling carriage system results in the selected pattern without too much deviation.

In accordance with a preferred embodiment of the invention, the travelling carriages 6, 8 of the first travelling carriage system 1 have adjustable brakes (not shown) which facilitate the adjustment of frictional forces on the movement of the travelling carriages 6, 8.

In accordance with a further preferred embodiment of the invention, in addition to the working head 20 which carries the tool (drawing pencil or engraving tool, etc.), a hand grip or handle is provided. The handle is fixed or fastened realtive to the travelling carriage 8 of the first travelling carriage system 1 so that none of the force from the hand of the user which might hinder the movement of the travelling carriages 16, 18 is translated to the compensation system 10. The handle, which is fixed or secured to the travelling carriage 8, lies within the working field 50, and preferably within the middle of the working field 50 of the compensation system 10.

While the invention has been shown and described with respect to a particular embodiment thereof, this is for the purpose of illustration rather than limitation, and other variations and modifications of the specific embodiment herein shown and described will be apparent to those skilled in the art within the intended spirit and scope of the invention. Accordingly, the patent is not to be limited in scope and effect to the specific embodiment herein shown and described nor in any other way that is inconsistent with the extend to which the progress in the art has been advanced by the invention.

What is claimed is:

1. A drawing or engraving device or plotter comprising:
   first and second travelling carriage systems, the first travelling carriage system comprising a first guide rail having a first travelling carriage movable along the first guide rail, and a second guide rail having a second travelling carriage movable along the second guide rail;
   the second travelling carriage system comprising a third guide rail having a third travelling carriage movable along the third guide rail, and a fourth guide rail having a fourth travelling carriage movable along the fourth guide rail, the third guide rail being linked to the second travelling carriage;
   a working head on the fourth travelling carriage;
   means for measuring the distances covered by the travelling carriages in different distances in order to indicate the actual coordinates in a selected coordinate system which the working head executes during use;
   drive means to drive the third and fourth travelling carriages, the drive means being locked when in a nonactivated state;
   programming means having input means for selection of selected coordinates which the user would like the working head to pass through during use;
   a memory for storage of the selected coordinates, the memory being operatively connected to the programming means;
   a computer which is operatively connected to the measuring means as well as to the memory and which determines any deviation of the actual coordinates from the selected coordinates; and
   control means operatively connected to the computer and to the drive means, the control means causing the drive means to drive the third and fourth travelling carriages to compensate for the deviation.

2. The drawing or engraving device in accordance with claim 1, whereby the second travelling carriage system constitutes a compensation system.

3. The drawing or engraving device in accordance with claim 1, where the computer determines limiting curves on either side of the selected pattern, the curves being stored in the memory; and
   the computer activating the control means when the actual pattern of the working head falls outside the area defined by the limiting curves.

4. The drawing or engraving device in accordance with claim 1, whereby the computer calculates overlapping tolerance areas for closely adjacent discrete points which approximate the selected coordinates and the computer activates the control means if the actual coordinates of the working head fall outside of the tolerance areas.

5. The drawing or engraving device according to claim 4, whereby the computer calculates an approximate value for the distance between the actual coordinates of the working head and the selected coordinates, and the computer activates the control means if the distance exceeds a given value.

6. The drawing or engraving device in accordance with claim 1, whereby a working field is selected for the second travelling carriage system, the working field being within the range of movement of the third and fourth travelling carriages; and the computer gives a warning signal if the working head moves outside of the working field.

7. The drawing or engraving device in accordance with claim 6, whereby the warning signal indicates the direction in which the working head moves outside the working field.

8. The drawing or engraving device in accordance with claim 1, whereby the memory stores the actual coordinates executed by the working head and the computer uses one or more actual coordinates of the to calculate the deviation between the actual coordinates and the selected coordinates.

9. A drawing or engraving device in accordance with claim 1, whereby a handle for guidance of the working head is firmly connected to the second travelling carriage.

10. A drawing or engraving device in accordance with claim 1, whereby a drawing head is positioned on the second travelling carriage to which the third guide rail of the second travelling carriage system is connected.

11. The drawing or engraving device in accordance with claim 1, whereby the drive means are electrically powered.

12. The drawing or engraving device in accordance with claim 1, whereby the computer calculates the Cartesian coordinates of the actual pattern which the working head executes;

the computer is linked to the memory which has the Cartesian coordinates of a selected pattern; and the computer calculates the difference between these coordinates to determine the deviation.

* * * * *